(12) United States Patent
Forrest et al.

(10) Patent No.: US 6,698,512 B2
(45) Date of Patent: Mar. 2, 2004

(54) VEHICLE HEATING AND AIR CONDITIONING SYSTEM INCLUDING A DUAL MODE MANUAL TEMPERATURE SELECTOR

(75) Inventors: Wayne Oliver Forrest, Gasport, NY (US); Phillip M. Sokolofsky, Akron, NY (US)

(73) Assignee: Delphi Technology, Inc., Troy, MI (US)

( * ) Notice: Subject to any disclaimer, the term of this patent is extended or adjusted under 35 U.S.C. 154(b) by 227 days.

(21) Appl. No.: 10/041,408

(22) Filed: Jan. 7, 2002

(65) Prior Publication Data

US 2003/0127219 A1 Jul. 10, 2003

(51) Int. Cl.[7] .............................. F25B 29/00; B60H 3/00
(52) U.S. Cl. ........................... 165/202; 165/42; 165/43; 165/263; 165/264; 165/265; 165/243; 62/229
(58) Field of Search ........................... 165/202, 42, 43, 165/263, 264, 265, 243; 62/229

(56) References Cited

U.S. PATENT DOCUMENTS

| | | | | |
|---|---|---|---|---|
| 4,323,111 A | * | 4/1982 | Iijima ........................... | 165/43 |
| 4,358,936 A | * | 11/1982 | Ito et al. ........................ | 165/43 |
| 4,365,663 A | * | 12/1982 | Inoue et al. .................... | 165/43 |
| 4,383,574 A | * | 5/1983 | Yoshioka ........................ | 165/43 |
| 4,450,897 A | * | 5/1984 | Iijima et al. ................... | 236/13 |
| 4,456,055 A | * | 6/1984 | Yoshimi et al. ................. | 165/42 |
| 4,466,480 A | * | 8/1984 | Ito et al. ........................ | 165/43 |
| 4,476,919 A | * | 10/1984 | Akimoto et al. ................ | 165/42 |
| 4,540,040 A | * | 9/1985 | Fukumoto et al. ............. | 165/43 |
| 4,766,950 A | * | 8/1988 | Yamada et al. ................ | 165/43 |
| 5,775,415 A | * | 7/1998 | Yoshimi et al. ............... | 165/202 |

FOREIGN PATENT DOCUMENTS

| JP | 1-136809 | * | 5/1989 |
|---|---|---|---|

* cited by examiner

Primary Examiner—John K. Ford
(74) Attorney, Agent, or Firm—Patrick M. Griffin

(57) ABSTRACT

An improved vehicle heating and air conditioning system includes a driver-manipulated temperature selector that is physically coupled to a discharge temperature control mechanism. The selector is operable in a normal mode in which movement of the selector away from a full cold setting produces a corresponding movement of the temperature control mechanism that increases the discharge air temperature by re-heating or a high fuel efficiency mode in which movement of the temperature selector away from the full cold setting allows the temperature control mechanism to remain in a full cold position for a limited range of selector movement while the discharge air temperature is increased by capacity reduction of the refrigerant compressor. The temperature selector is in the form of a rotary knob that is axially shiftable to change modes when the selector is positioned at the full cold setting and spring-biased so that the normal mode is established as the default mode.

9 Claims, 5 Drawing Sheets

VEHICLE HEATING AND AIR CONDITIONING SYSTEM INCLUDING A DUAL MODE MANUAL TEMPERATURE SELECTOR

TECHNICAL FIELD

This invention relates to a vehicle heating and air conditioning system in which a driver-manipulated temperature selector is physically coupled to a temperature control device for adjusting the discharge air temperature of the system, where the temperature selector is operable in a selected one of two modes.

BACKGROUND OF THE INVENTION

Manually regulated vehicle heating and air conditioning systems include an operator interface for enabling or disabling air conditioning, and for selecting airflow mode (i.e., panel, defrost, etc.), blower speed, and discharge air temperature. When air conditioning is enabled, a refrigerant compressor is activated and then capacity controlled based on a system temperature or pressure to maintain the evaporator temperature a few degrees above the freezing point of water to provide maximum cooling and dehumidification while preventing evaporator icing. The discharge air temperature is selected by positioning a temperature control lever or knob, which is often physically coupled to a temperature control door that directs all or a portion of the air exiting the evaporator through a heater core coupled to the engine coolant circulation system. In typical operation in warm ambient conditions, the driver will enable air conditioning, and set the blower speed to high and the temperature selector to full cold. As the vehicle cabin cools down, the driver usually lowers the blower speed and adjusts the temperature selector until a desired combination of discharge air flow and temperature is achieved. In this scenario, the compressor control remains essentially unchanged, and a portion of the air exiting the evaporator is re-heated by the heater core to achieve the desired air discharge temperature.

It has been recognized that the efficiency of the above-described control can be improved by regulating the capacity of the compressor as the temperature selector is moved away from the full cold setting. In this way, the evaporator temperature is allowed to increase above the full cold setting, and the need for re-heating to achieve the desired air discharge temperature is reduced. For example, the U.S. Pat. No. 4,383,574 discloses a control wherein movement of the temperature selector in the cold-to-medium portion of the temperature control range changes the capacity of the refrigerant compressor while an air mixing device is maintained in the full-cold position, and movement of the temperature selector in the medium-to-hot portion of the temperature control range changes the position of the air mixing device to heat the discharge air.

While a system like that described in the aforementioned U.S. Pat. No. 4,383,574 can achieve improved system efficiency when air conditioning is enabled by lowering the compressor input power requirement, it requires an alteration of the usual coupling between the temperature selector and the temperature control door that prohibits normal operation of the system, which is required for maximum dehumidification. It also creates an undesired temperature control non-linearity when air conditioning is disabled, since movement of the temperature selector in the cold-to-medium portion of the temperature control range will produce no change in the discharge air temperature. Accordingly, what is needed is a heating and air conditioning system including manually adjusted temperature selector that is capable of being selectively operated in either a normal mode for maximum dehumidification or a high fuel efficiency mode for reducing energy consumption at a somewhat higher cabin humidity level, where linearity between selector movement and discharge temperature adjustment is preserved regardless of the selected mode.

SUMMARY OF THE INVENTION

The present invention is directed to an improved vehicle heating and air conditioning system including a driver-manipulated temperature selector that is physically coupled to a discharge temperature control mechanism, wherein the selector is operable in a normal mode in which movement of the selector away from a full cold setting produces a corresponding movement of the temperature control mechanism that increases the discharge air temperature by re-heating or a high fuel efficiency mode in which movement of the selector away from the full cold setting allows the temperature control mechanism to remain in a full cold position for a limited range of selector movement while the discharge air temperature is increased by capacity reduction of the refrigerant compressor. In the preferred embodiment, the temperature selector is in the form of a rotary knob that is axially shiftable to change modes when the selector is positioned at the full cold setting and spring-biased so that the normal mode is established as the default mode.

BRIEF DESCRIPTION OF THE DRAWINGS

FIG. 3A is a sectional view of the selector, while FIG. 3B is an isometric view of a portion of the selector.

FIG. 4A is a sectional view of the selector, while FIG. 4B is an isometric view of a portion of the selector.

DESCRIPTION OF THE PREFERRED EMBODIMENT

Figure 1:
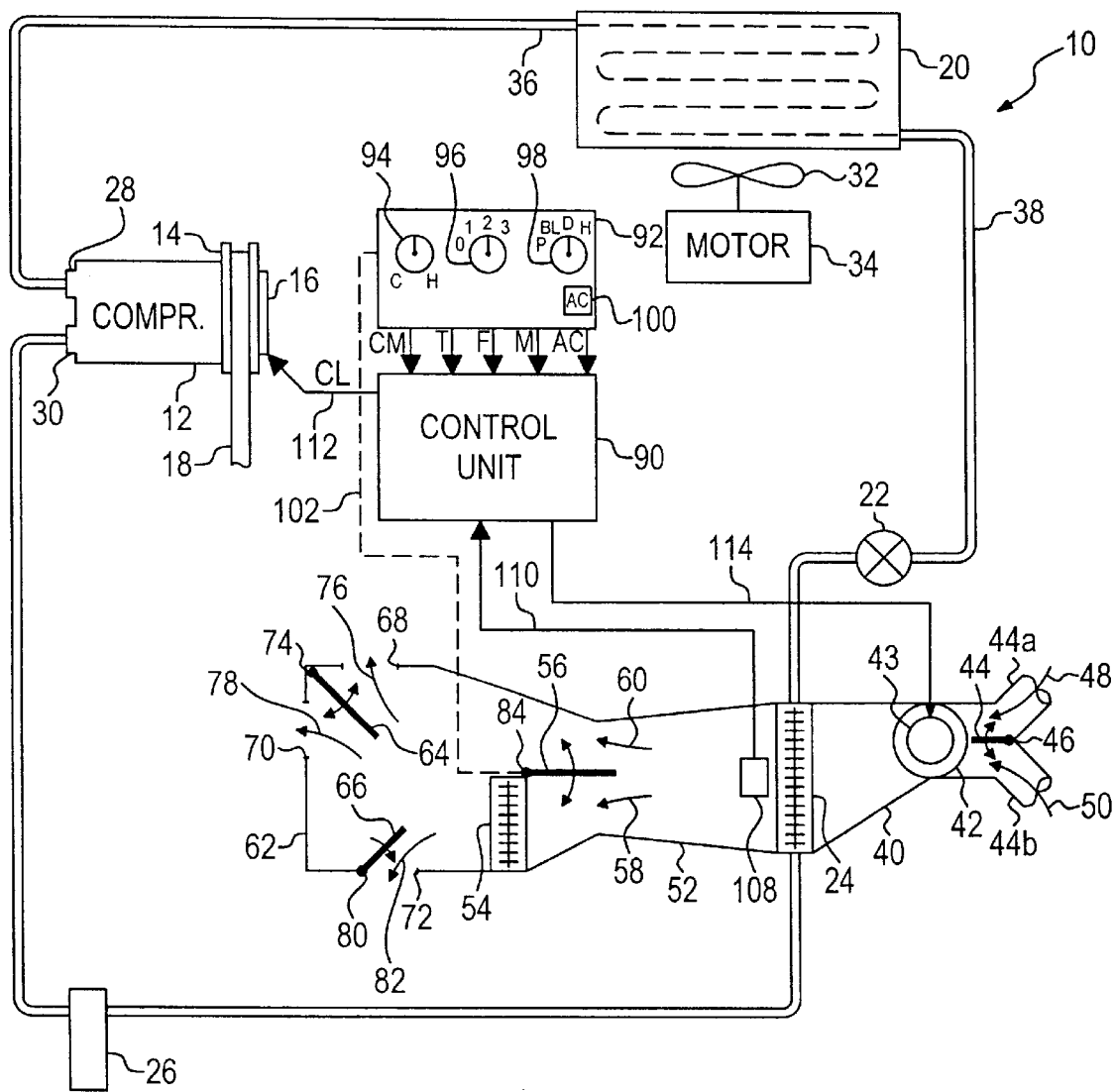
FIG. 1 is a block diagram of a vehicle heating and air conditioning system according to this invention, including a microprocessor-based control unit, a temperature control mechanism and driver manipulated temperature selector according to this invention.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a fixed stroke, and is cycled on and off via clutch 16 to control its capacity, but the method of this invention equally applies to systems where the stroke or displacement of the compressor is adjustable to achieve capacity control. The pulley 14 is coupled to a rotary shaft of the vehicle engine (not shown) via drive belt 18, and as indicated above, the clutch 16 is selectively engaged or disengaged to turn the compressor 12 on or off, respectively. The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 pivoted at point 46 is adjustable as shown to control inlet air mixing. Depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes that conduct engine coolant. The outlet duct 52 is bifurcated with the heater core 54 disposed in one air stream of duct 52. A temperature control door 56 pivoted at a point 84 near the heater core 54 is adjustable as shown to control what proportion of air exiting evaporator 24 must pass through the heater core 54. Air passing through heater core 54 is indicated by the arrow 58, while air bypassing the heater core 54 is indicated by the arrow 60. The heated and unheated air portions are mixed in a plenum portion 62 of outlet duct 52 downstream of heater core 54 and temperature control door 56, and a pair of mode control doors 64, 66 direct the mixed air through one or more outlets, including a defrost outlet 68, a panel outlet 70, and a heater outlet 72. The mode control doors 64 and 66, pivoted at points 74 and 80, respectively, are adjustable as shown to switch the outlet air between various combinations of defrost outlet 68, panel outlet 70 and heater outlet 72, as indicated by arrows 76, 78 and 82, respectively.

A microprocessor-based control unit 90 and driver interface panel 92 control the capacity of compressor 12, the speed of blower motor 43 and the position of inlet air control door 44 and mode control doors 64, 66, primarily in response to driver-manipulation of the interface panel control knobs 94, 96, 98 and the air conditioning enable/disable switch (AC) 100. For purposes of the compressor capacity control, a suitable temperature sensor 108 located on the evaporator 24 or in the outlet air stream of evaporator 24 supplies control unit 90 an evaporator outlet air temperature signal on line 110. The output signal for the clutch 16 appears on line 112, and the output signal for controlling blower motor 43 appears on line 114; for simplicity, output signals and actuators for the air control doors 44, 64, 66 have been omitted. In general, the temperature (T), fan (F) and mode (M) commands supplied to control unit 90 by interface panel 92 indicate the rotary positions of the control knobs 94, 96 and 98, and the air conditioning (AC) signal indicates the position of switch 100. Although not indicated in FIG. 1, most manually controlled air conditioning interface panels also include a switch for selecting the source of inlet air, which dictates the position of inlet air control door 44.

According to the present invention, the temperature control knob 94 is physically coupled to the temperature control door 56 via Bowden cable 102, and the interface panel 92 supplies inputs to control unit 90 indicative of the rotary position of knob 94 and its mode of operation. The selected mode of operation (normal or high fuel efficiency) is designated as control mode CM, and the rotary position of the knob 94 is designated as temperature command T as mentioned above.

Figure 2:
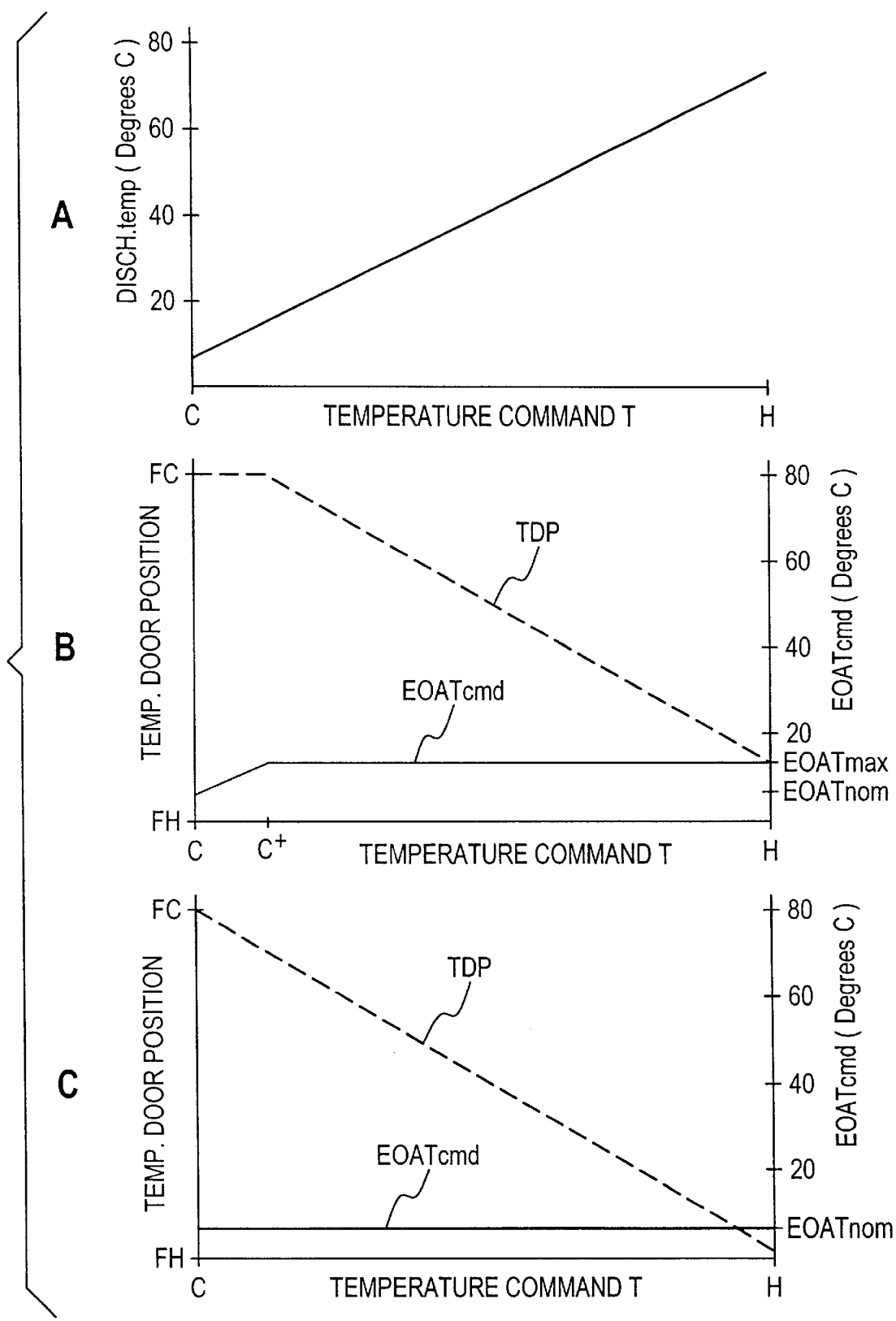
FIG. 2, Graphs A–C, depict a control of the heating and air conditioning system of FIG. 1 according to this invention.

When the state of the CM signal indicates that the normal control mode is selected, the control unit 90 regulates the compressor capacity to maintain the evaporator temperature at a nominal target value EOATnom a few degrees above the freezing point of water as indicated by the solid trace in Graph C of FIG. 2 to provide maximum dehumidification while preventing icing on the evaporator 24. In such mode, rotation of the temperature selector knob 94 produces continuous movement of the temperature control door 56 from the full cold (FC) to the full hot (FH) settings, as shown by the dashed temperature door position (TDP) trace in Graph C. The combined effect of the evaporator outlet air temperature control and the re-heating due to the temperature control door position produces a discharge air temperature that varies substantially linearly with temperature command T, as indicated in Graph A.

When the state of the CM signal indicates that the high fuel efficiency control mode is selected, the control unit 90 regulates the compressor capacity at a reduced level characterized by a somewhat elevated evaporator temperature command as indicated by the solid trace in Graph B of FIG. 2. The variation of EOATcmd from EOATnom to EOATmax in the temperature command range of C to $C^+$ produces a discharge air temperature that varies substantially linearly with temperature command T as shown in Graph A of FIG. 2 when the temperature control door 56 is positioned to prevent re-heating of the evaporator outlet air. Accordingly, rotation of temperature selector knob 94 in the range of C to $C^+$ produces no movement of the temperature control door 56, as indicated by the temperature door position (TDP) trace in Graph B. Further rotation of the selector knob 94 produces continuous movement of the temperature control door 56 while EOATcmd is maintained at EOATmax as indicated in Graph B, and the combined effect of the evaporator outlet air temperature control and the re-heating due to the temperature control door position produces a discharge air temperature that varies substantially linearly with temperature command T, as indicated by Graph A of FIG. 2.

Figure 3A:
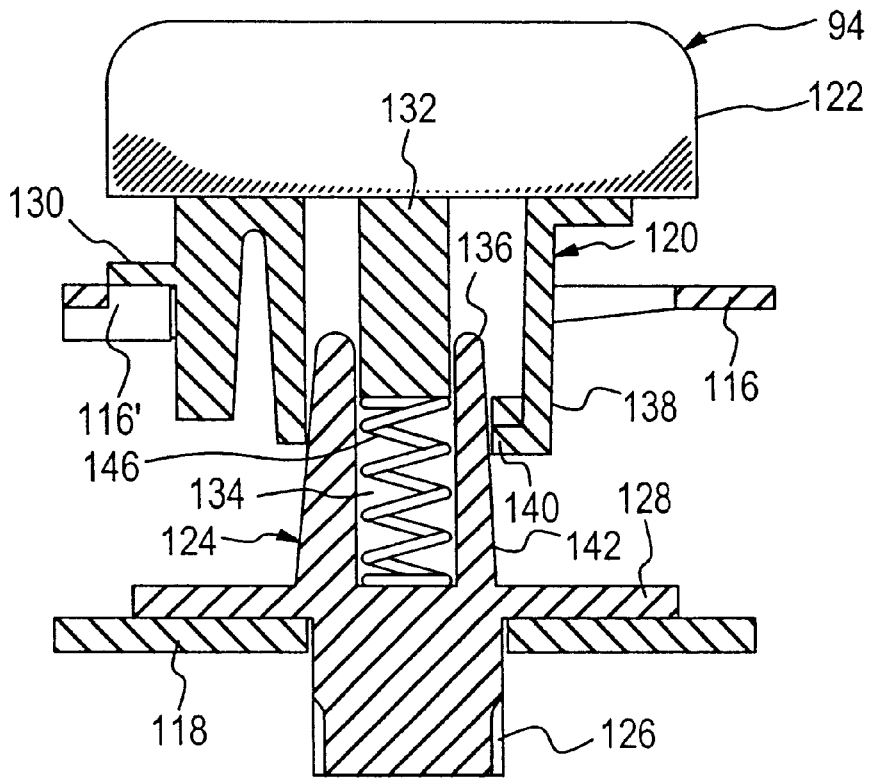
FIGS. 3A and 3B depict the driver manipulated temperature selector of FIG. 1 at a full cold setting in the normal mode.
Figure 3B:
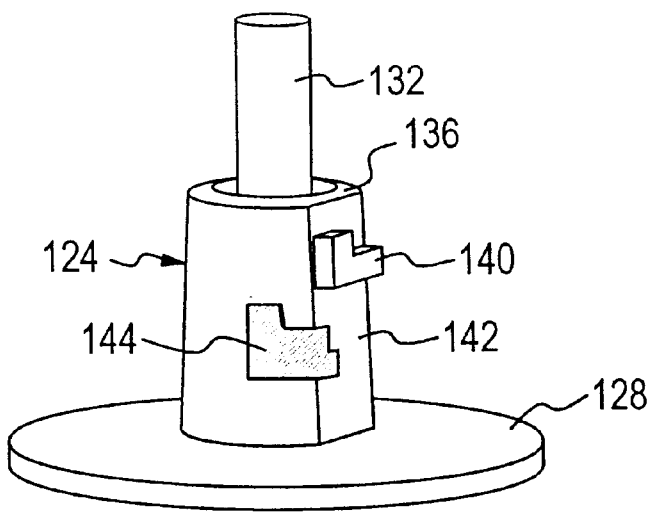
Figure 4A:
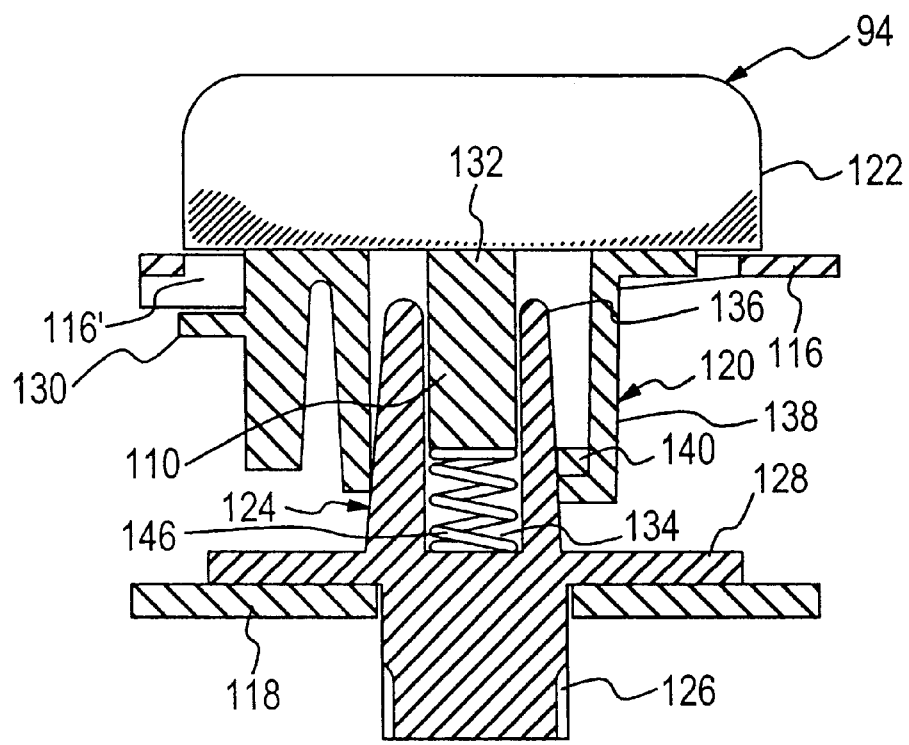
FIGS. 4A and 4B depict the driver manipulated temperature selector of FIG. 1 at a full cold setting in the high fuel efficiency mode.
Figure 4B:
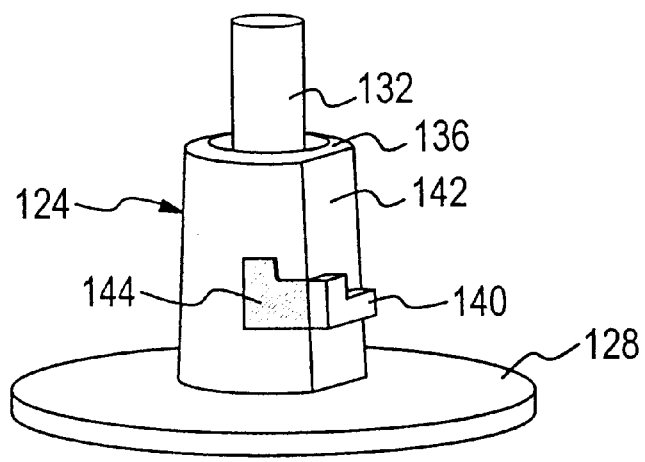
Figure 5:
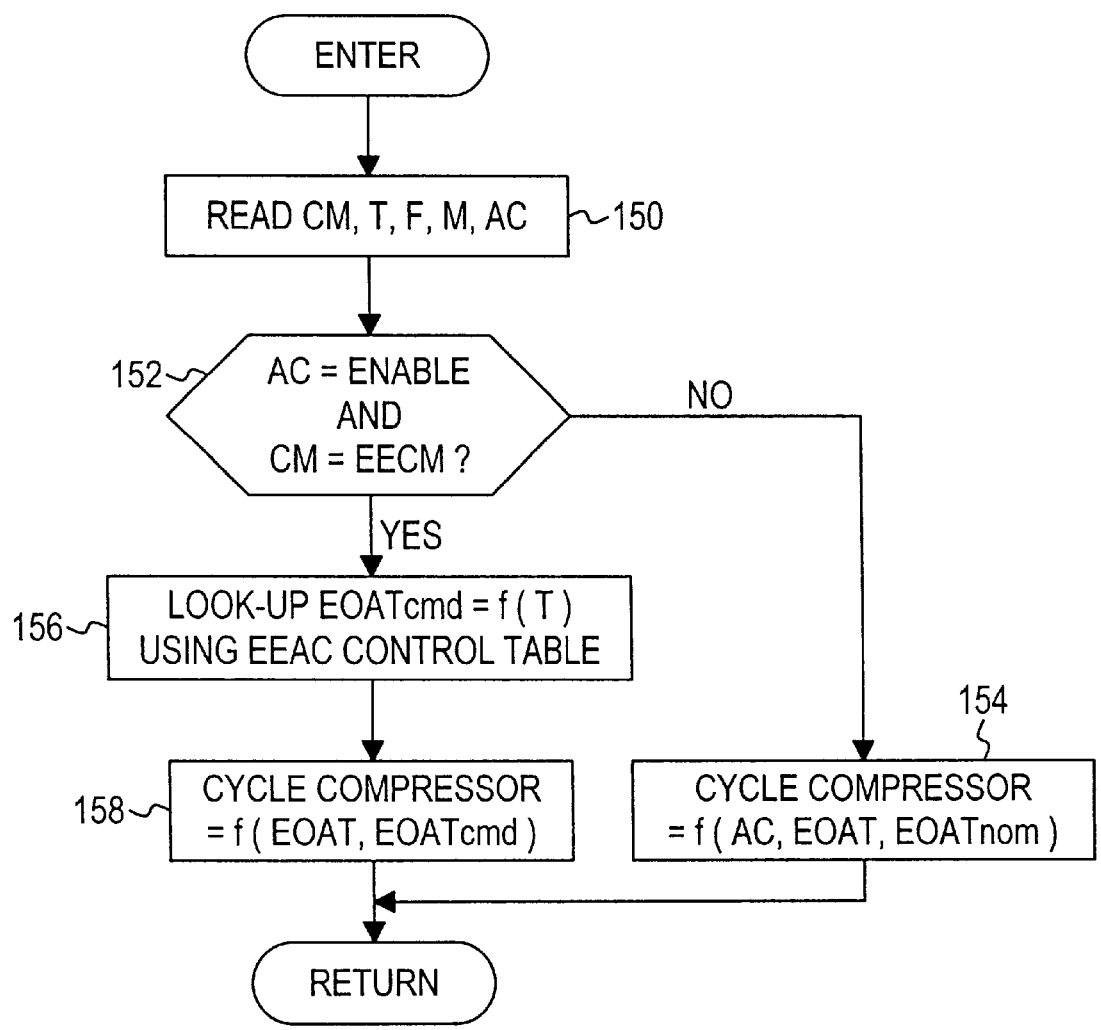
FIG. 5 is a flowchart illustrating a software routine executed by the microprocessor-based control unit of FIG. 1 according to this invention.

FIGS. 3A–3B and 4A–4B detail an implementation of temperature selector 94 according to a preferred embodiment of this invention. As best seen in FIGS. 3A and 4A, the temperature selector 94 is mounted in an interface panel housing having upper and lower plates 116 and 118. The temperature selector 94 includes a driving (upper) member 120 that is integral with a operator-manipulated rotary knob 122, and a driven (lower) member 124 having an output gear 126 designed for attachment to a conventional Bowden cable drive mechanism (not shown) so that rotation of the driven member 124 produces linear movement of the cable 102 for positioning the temperature control door 56. The driven member 124 partially extends through an opening in the lower plate 118 as shown, and has an integral circular flange 128 that rests on an upper surface of the plate 118. The driving member 120 passes through an opening in the upper plate 116, and has an integral arcuate flange 130 capable of passing through a keyway 116' in plate 116 when the knob 122 is positioned to a full cold setting. Otherwise, the plate 116 interferes with the flange 130 in a manner to control or limit axial displacement of the driving member 120 relative to the panel 92, as explained below. The driving member 120 additionally includes a central post 132 received within a central axial bore 134 formed in a stem 136 of the driven member 124, and a tubular portion 138 surrounding the outer periphery of the stem 136. As best seen in FIGS. 3B and 4B, the tubular portion 138 includes an L-shaped radially inward protrusion 140, and the stem 136 has a flat surface 142 with an adjacent L-shaped recess 144. Finally, a spring 146 disposed between the end of post 132 and the bottom of the bore 134 biases the post 132 (and hence knob 122) outward—that is, away from driven member 124, the flange 128 of which remains in contact with the lower plate 118.

In the normal mode of operation depicted in FIGS. 3A–3B, the driving member 120 is displaced upward by the spring 146 so that the L-shaped protrusion 140 continuously engages the flat surface 142 of stem 136. This is most clearly shown in the isometric view of FIG. 3B where only the L-shaped protrusion 140 of tubular portion 138 is illustrated. In this mode, any rotation of the knob 122 produces a corresponding rotation of the output gear 126 and a corresponding displacement of the cable 102, achieving the control function represented by the TDP trace in Graph C of FIG. 2. Also, interference between the plate 116 and the arcuate flange 130 prevents depression of the knob 122 in all but the full cold setting where the flange 130 is aligned with the keyway 116'.

When the operator wishes to engage the high fuel efficiency mode of operation, the knob 122 is rotated to the full cold setting so that the flange 130 is aligned with the keyway 116', and the knob 122 is then depressed against the bias of spring 146 as depicted in FIGS. 4A–4B. When depression of the knob 122 is limited by interference between the knob 122 and the upper surface of plate 116, the L-shaped protrusion 140 is axially aligned with the L-shaped recess 144, and the arcuate flange 130 clears the lower surface of plate 116. When the knob 122 is so depressed, rotation of the knob 122 away from the full cold setting (clockwise, as viewed in FIGS. 4A–4B) allows the protrusion 140 to rotate into the recess 144 without producing a corresponding rotation of the driven member 124. This lost motion achieves the control function represented by the TDP trace in Graph B of FIG. 2 in the temperature command range of C to $C^+$. The rotation of the knob 122 away from the full cold setting also rotates the flange 130 out of the keyway 116' so that interference between the flange 130 and plate 116 prevents the spring 146 from returning the knob 122 to the normal mode position depicted in FIGS. 3A–3B.

Further clockwise rotation of the knob 122 produces a corresponding rotation of the driven member 124, achieving the control function represented by the TDP trace in Graph B of FIG. 2 in the temperature command range of $C^+$ to H. During such rotation, the taper of the plate 116 allows the spring 146 to progressively displace the knob 122 upward until the protrusion 140 is displaced fully upward in the recess 144. The consequent interference between protrusion 140 and recess 144 creates a bi-directional coupling between the driving and driven members 120, 124 so that when the knob 122 is rotated counter-clockwise in the temperature command range of $C^+$ to H, the control function represented by the TDP trace in Graph B of FIG. 2 is maintained. As the operator rotates the knob 122 toward the full cold setting, the taper of plate 116 depresses the driving member 120 so that when the temperature command $C^+$ is achieved, the protrusion 140 again becomes free to rotate within the recess 144. Further counter-clockwise rotation of the knob 122 (i.e., beyond the $C^+$ setting) rotates the protrusion 140 out of the recess 144 without producing a corresponding rotation of the driven member 124, and unless the operator is manually depressing the knob 122, the spring 146 will return the knob 122 to the normal mode position of FIGS. 3A–3B when the knob 122 reaches the full cold setting.

FIG. 4 depicts a flow diagram representative of a software routine periodically executed by the control unit 90 for controlling the operation of compressor 12 and temperature control door 56 according to this invention. First, the block 150 reads the various inputs from driver interface panel 92. The block 152 then determines if the AC command is enabling air conditioning and the control mode CM indicates that the energy efficient control mode (EECM) is enabled. If one or more of the conditions is not met, the normal control mode is activated, and the block 154 controls compressor cycling (if enabled by the defrost mode or the AC command) based on a nominal evaporator outlet temperature target (EOATnom) such as 2 degrees C. As will be well known in the art, the compressor cycling of block 154 may involve a limit cycle control in which the compressor clutch 16 is engaged when the EOAT exceeds EOATnom, and disengaged when EOAT falls below (EOATnom-Khys), where Khys is a hysteresis constant. If the conditions of block 152 are met, the blocks 156 and 158 are executed to determine EOATcmd by table look-up as a function of temperature command T, substantially as depicted by the EOATcmd trace in Graph B of FIG. 2, and to cycle compressor 12 on and off as required to bring EOAT into conformance with EOATcmd. As with block 154, the compressor cycling of block 158 may involve a limit cycle control in which the compressor clutch 16 is engaged when the EOAT exceeds EOATcmd, and disengaged when EOAT falls below (EOATcmd-Khys), where Khys is a hysteresis constant.

With the above-described system, the operator of the vehicle manipulates the temperature control selector 94 to control the discharge air temperature and to select either the normal control mode or the high fuel efficiency control mode. When the knob 122 is rotated to the full cold position, the spring 146 biases the knob 122 outward, engaging the normal control mode. When the knob 122 is simply rotated away from the full cold position, the normal control mode is maintained; the cable 102 moves the temperature control door 56 to permit increased re-heating by the heater core 54, and the mechanical gain is calibrated so that the discharge air temperature corresponds to the temperature command T, assuming that control unit 90 maintains EOAT substantially equal to EOATnom. On the other hand, the operator may engage the high fuel efficiency mode by first depressing the knob 122, and then rotating it away from the full cold position. In this case, initial rotation of the knob 122 produces no movement of the temperature control door 56, and the control unit 90 cycles the compressor clutch to maintain EOAT substantially equal to EOATcmd, which is calibrated to produce a discharge air temperature corresponding to temperature command T. When the knob 122 rotated further, EOATcmd is maintained at a fixed value EOATmax, and the cable 102 moves the temperature control door 56 to permit increased re-heating by the heater core 54 in order to satisfy the temperature command T. If the driver wishes to change control modes, the knob 122 is simply rotated back to the full cold setting, and the above-described decision process is repeated. When air conditioning is disabled by the switch 100, the temperature selector 94 is operated in the normal control mode in which rotation of knob 122 produced continuous movement of the temperature control door 56, resulting in a linear relationship between the discharge air temperature and the temperature command T.

In summary, the control of the present invention achieves dual mode operation of a vehicle heating and air conditioning system with a manually adjusted temperature selector, with preservation of linearity between selector movement and discharge temperature adjustment regardless of the selected mode. While described in reference to the illustrated embodiment, it is expected that various modifications in addition to those mentioned above will occur to those skilled in the art. For example, a similar control function could be achieved with a linearly displaceable temperature selector; the system could include an indicator lamp to display the selected mode; and so on. Thus, it will be understood that systems incorporating these and other modifications may fall within the scope of this invention, which is defined by the appended claims.

What is claimed is:

1. A motor vehicle heating and air conditioning system including a refrigerant compressor, an evaporator, and a temperature control mechanism positionable to control re-heating of air exiting the evaporator, the system comprising:

a temperature selector manually adjustable to select a temperature setting, and mechanically coupled to the temperature control mechanism for positioning the temperature control mechanism as a function of the selected temperature setting, the temperature selector being selectively operable in: (1) a normal mode wherein adjustment of the temperature selector produces a corresponding change in re-heating regardless of the temperature setting, or (2) a high fuel efficiency mode wherein adjustment of the temperature selector produces no change in re-heating when the temperature setting is within a designated range of temperature settings including a full cold temperature setting, and a corresponding change in re-heating when the temperature setting is outside said designated range; and a controller effective when the high fuel efficiency mode is selected and the temperature setting is within said designated range to control a capacity of said refrigerant compressor based on the temperature setting.

2. The system of claim 1, wherein the temperature selector includes a mechanism that permits changing between the normal mode and the high fuel efficiency mode when the temperature setting is the full cold setting.

3. The system of claim 1, wherein the temperature selector includes a knob that is manually rotatable to select a temperature setting, and that is axially shiftable to select one of the normal and high fuel efficiency modes when the temperature setting is the full cold setting.

4. The system of claim 3, wherein the temperature selector includes a spring that axially biases the knob to the select the normal mode when the temperature setting is the full cold setting.

5. The system of claim 1, wherein the temperature selector includes a driving member manually adjustable to select a temperature setting, a driven member mechanically coupled to the temperature control mechanism, and a coupling that is operable in the normal mode to couple the driving member to the driven member with no lost motion, and in the high fuel efficiency mode to couple the driving member to the driven member with lost motion when the selected temperature setting is within said designated range.

6. The system of claim 5, wherein the coupling comprises complementary features on the driving and driven members, where such features are in alignment during the high fuel efficiency mode of operation, and out of alignment during the normal mode of operation.

7. The system of claim 6, wherein the temperature selector includes a spring that biases the complementary features out of alignment to automatically select the normal mode of operation when the selected temperature setting is the full cold setting.

8. A motor vehicle heating and air conditioning system including a refrigerant compressor, an evaporator, a temperature control mechanism positionable to control re-heating of air exiting the evaporator, an operator-adjusted temperature selector mechanically coupled to the temperature control mechanism, and a controller for controlling a capacity of said refrigerant compressor, the improvement wherein:

the operator-adjusted temperature selector is operable in a normal mode in which adjustment of the temperature selector away from a full cold setting produces a corresponding movement of the temperature control mechanism that increases said re-heating, or a high fuel efficiency mode in which adjustment of the temperature selector away from the full cold setting allows the temperature control mechanism to remain in a full cold position for a predetermined range of temperature selector adjustment; and the controller controls the capacity of the refrigerant compressor to produce a discharge air temperature corresponding to the selected temperature when the temperature selector is operated in the high fuel efficiency mode and in said predetermined range of selector adjustment.

9. The improvement of claim 8, wherein the temperature selector includes a mechanism that permits changing between the normal mode and the high fuel efficiency mode when the temperature selector is adjusted to the full cold setting.

* * * * *